(12) United States Patent
Jiang et al.

(10) Patent No.: US 10,166,899 B1
(45) Date of Patent: Jan. 1, 2019

(54) RATCHETING HEADREST ASSEMBLY

(71) Applicant: Diamay North America Automotive, inc., Redford, MI (US)

(72) Inventors: Yintai Jiang, Shanghai (CN); Jianhua Wang, Novi, MI (US); Guojun Tang, Zhoushan (CN)

(73) Assignee: DAIMAY NORTH AMERICA AUTOMOTIVE, INC., Redford, MI (US)

( * ) Notice: Subject to any disclaimer, the term of this patent is extended or adjusted under 35 U.S.C. 154(b) by 0 days.

(21) Appl. No.: 15/983,358

(22) Filed: May 18, 2018

Related U.S. Application Data

(63) Continuation of application No. PCT/CN2018/079294, filed on Mar. 16, 2018.

(51) Int. Cl.
| | | |
|---|---|---|
| *B60N 2/847* | (2018.01) | |
| *B60N 2/838* | (2018.01) | |
| *B60N 2/856* | (2018.01) | |
| *A47C 7/38* | (2006.01) | |

(52) U.S. Cl.
CPC .............. *B60N 2/847* (2018.02); *B60N 2/838* (2018.02); *B60N 2/856* (2018.02); *A47C 7/38* (2013.01)

(58) Field of Classification Search
CPC ......... B60N 2/856; B60N 2/847; B60N 2/838
See application file for complete search history.

(56) References Cited

U.S. PATENT DOCUMENTS

| | | | | |
|---|---|---|---|---|
| 4,674,797 A | * | 6/1987 | Tateyama | B60N 2/847 297/408 |
| 6,045,181 A | * | 4/2000 | Ikeda | B60N 2/847 297/216.12 |
| 8,979,203 B1 | * | 3/2015 | Sutter, Jr. | B60N 2/4847 297/408 |
| 9,061,615 B2 | | 6/2015 | Wang et al. | |
| 2007/0164593 A1 | | 7/2007 | Brockman | |
| 2007/0284929 A1 | | 12/2007 | Keller et al. | |
| (Continued) | | | | |

FOREIGN PATENT DOCUMENTS

CN 102649405 A 8/2012

OTHER PUBLICATIONS

International Search Report and Written Opinion for the International Application No. PCT/CN2018/079294 dated Aug. 23, 2018.

*Primary Examiner* — Timothy J Brindley
(74) *Attorney, Agent, or Firm* — Carlson, Gaskey & Olds, P.C.

(57) ABSTRACT

A headrest assembly according to an exemplary aspect of the present disclosure includes a head restraint configured to rotate from a first locked position to a second locked position to incline the head restraint relative to a seat back. Further, the head restraint is configured such that rotation of the head restraint beyond the second locked position causes the head restraint to become urged back to the first locked position. The head restraint includes a ratchet assembly having a pawl and pawl spring, and the pawl spring includes a first section and a second section. The first section of the pawl spring is configured to contact the pawl when the head restraint is rotated from the first locked position to the second locked position, and the second section of the pawl spring is configured to contact the pawl when the head restraint is rotated beyond the second locked position.

25 Claims, 3 Drawing Sheets

(56) References Cited

U.S. PATENT DOCUMENTS

| | | | |
|---|---|---|---|
| 2008/0030061 A1* | 2/2008 | Pejathaya | B60N 2/856 297/367 R |
| 2010/0078984 A1* | 4/2010 | Jammalamadaka | B60N 2/844 297/410 |
| 2010/0219670 A1 | 9/2010 | Jammalamadaka et al. | |
| 2011/0095592 A1 | 4/2011 | Willard et al. | |
| 2011/0221250 A1 | 9/2011 | Little | |
| 2012/0068517 A1 | 3/2012 | Yetukuri et al. | |
| 2014/0210244 A1* | 7/2014 | Tobata | B60N 2/841 297/408 |
| 2014/0284985 A1* | 9/2014 | Hartlaub | B60N 2/4841 297/408 |
| 2015/0367764 A1* | 12/2015 | Laperriere, III | B60N 2/847 297/408 |
| 2015/0375649 A1* | 12/2015 | Jeong | A47C 7/38 297/391 |
| 2018/0118062 A1* | 5/2018 | Laperriere | B60N 2/847 |

\* cited by examiner

RATCHETING HEADREST ASSEMBLY

RELATED APPLICATION(S)

This application is a continuation of PCT Application No. PCT/CN2018/079294, filed Mar. 16, 2018, which is herein incorporated by reference in its entirety.

TECHNICAL FIELD

This disclosure relates to a ratcheting headrest assembly for a seat in a vehicle. This disclosure also relates to a seat and a method of use.

BACKGROUND

Headrests are configured to be positioned relative to the rear of an occupant's head and/or neck. Some headrests are configured to rotate to a plurality of positions to accommodate a preference of the occupant.

SUMMARY

A headrest assembly according to an exemplary aspect of the present disclosure includes, among other things, a head restraint configured to rotate from a first locked position to a second locked position to incline the head restraint relative to a seat back. Further, the head restraint is configured such that rotation of the head restraint beyond the second locked position causes the head restraint to become urged back to the first locked position. The head restraint includes a ratchet assembly having a pawl and pawl spring, and the pawl spring includes a first section and a second section. The first section of the pawl spring is configured to contact the pawl when the head restraint is rotated from the first locked position to the second locked position, and the second section of the pawl spring is configured to contact the pawl when the head restraint is rotated beyond the second locked position.

In a further non-limiting embodiment of the foregoing headrest assembly, the second section of the pawl spring lies in a different plane than the first section of the pawl spring.

In a further non-limiting embodiment of any of the foregoing headrest assemblies, the second section of the pawl spring is configured to contact a side of the pawl when the head restraint is rotated beyond the second locked position.

In a further non-limiting embodiment of any of the foregoing headrest assemblies, the ratchet assembly includes a cam having a first tooth corresponding to the first locked position and a second tooth corresponding to the second locked position, and the pawl is configured to engage the first and second teeth to hold the head restraint in the first and second locked positions, respectively.

In a further non-limiting embodiment of any of the foregoing headrest assemblies, the first section of the pawl spring is configured to urge the pawl into engagement with the first and second teeth.

In a further non-limiting embodiment of any of the foregoing headrest assemblies, the cam includes a third tooth larger than the first and second teeth, the pawl is configured to engage the third tooth when the head restraint is rotated beyond the second locked position, engagement between the third tooth and the pawl is configured to rotate the pawl to a release position where the pawl does not engage the first and second teeth, the pawl is held in the release position by the second section of the pawl spring.

In a further non-limiting embodiment of any of the foregoing headrest assemblies, when the pawl is in the release position, the head restraint is urged to the first locked position by a spring.

In a further non-limiting embodiment of any of the foregoing headrest assemblies, the ratchet assembly is configured such that when the head restraint rotates back to the first locked position, the third tooth engages the pawl to rotate the pawl back into engagement with the first tooth of the cam.

In a further non-limiting embodiment of any of the foregoing headrest assemblies, the pawl is configured to rotate about an axis, the pawl includes a first arm and a second arm projecting from opposite sides of the axis, the first arm of the pawl is configured to engage the first and second teeth, and the second arm of the pawl is configured to engage the third tooth when the head restraint rotates back to the first locked position.

In a further non-limiting embodiment of any of the foregoing headrest assemblies, the first locked position corresponds to a substantially upright position of the head restraint relative to the seat back, and the second locked position is inclined relative to the first locked position.

In a further non-limiting embodiment of any of the foregoing headrest assemblies, the second locked position is a last locked position, and a plurality of locked positions are provided between the first and last locked positions.

A seat for a motor vehicle according to an exemplary aspect of the present disclosure includes, among other things, a seat back and a headrest assembly. The headrest assembly includes a head restraint configured to rotate from a first locked position to a second locked position to incline the head restraint relative to the seat back. Further, the head restraint is configured such that rotation of the head restraint beyond the second locked position causes the head restraint to become urged to the first locked position, and the head restraint includes a ratchet assembly having a pawl and pawl spring. The pawl spring includes a first section and a second section, and the first section of the pawl spring is configured to contact the pawl when the head restraint is rotated from the first locked position to the second locked position. The second section of the pawl spring is configured to contact the pawl when the head restraint is rotated beyond the second locked position.

In a further non-limiting embodiment of the foregoing seat, the second section of the pawl spring lies in a different plane than the first section of the pawl spring.

In a further non-limiting embodiment of any of the foregoing seats, the first section of the pawl spring is configured to contact an end of the pawl when the head restraint is rotated from the first locked position to the second locked position, and the second section of the pawl spring is configured to contact a side of the pawl when the head restraint is rotated beyond the second locked position.

In a further non-limiting embodiment of any of the foregoing seats, the ratchet assembly includes a cam having a first tooth corresponding to the first locked position and a second tooth corresponding to the second locked position, and the pawl is configured to engage the first and second teeth to hold the head restraint in the first and second locked positions, respectively.

In a further non-limiting embodiment of any of the foregoing seats, the cam includes a third tooth larger than the first and second teeth, the pawl is configured to engage the third tooth when the head restraint is rotated beyond the second locked position, engagement between the third tooth and the pawl is configured to rotate the pawl to a release position where the pawl cannot engage the first and second teeth, and the pawl is held in the release position by the second section of the pawl spring.

In a further non-limiting embodiment of any of the foregoing seats, the ratchet assembly is configured such that when the head restraint rotates back to the first locked position, the third tooth engages the pawl to rotate the pawl back into engagement with the first tooth of the cam.

A method according to an exemplary aspect of the present disclosure includes tilting a head restraint to move the head restraint from a first locked position to a second locked position. The head restraint is held in the first and second locked positions by a ratchet assembly including a pawl and a pawl spring. The pawl spring having a first section and a second section lying in a different plane than the first section, and the first section of the pawl spring is in contact with the pawl as the head restraint is tilted from the first locked position to the second locked position. The method further includes tilting a head restraint beyond the second locked position, and moving the head restraint back to the first locked position. Further, the second section of the pawl spring is in contact with the pawl as the head restraint moves back to the first locked position.

In a further non-limiting embodiment of the foregoing method, the method includes rotating the pawl such that the pawl contacts the first section of the pawl spring when the head restraint is moved back to the first locked position.

In a further non-limiting embodiment of any of the foregoing methods, the head restraint includes a first plurality of teeth and a tooth larger than the first plurality of teeth, the tooth rotates the pawl into contact with the second section of the pawl spring when the head restraint is tilted beyond the second locked position, and the tooth rotates the pawl into contact with the first section of the pawl spring when the head restraint is moved back to the first locked position.

DETAILED DESCRIPTION

This disclosure generally relates to a headrest assembly, seat, and a method of use. An exemplary headrest assembly includes a head restraint configured to rotate from a first locked position to a second locked position to incline the head restraint relative to a seat back. The head restraint is configured such that rotation of the head restraint beyond the second locked position causes the head restraint to become urged back to the first locked position. Further, the head restraint includes a ratchet assembly having a pawl and pawl spring. The pawl spring includes a first section and a second section. The first section of the pawl spring is configured to contact the pawl when the head restraint is rotated from the first locked position to the second locked position, and the second section of the pawl spring is configured to contact the pawl when the head restraint is rotated beyond the second locked position. The disclosed arrangement reduces the number of component parts relative to prior designs, which provides a relatively compact arrangement leading to reduced cost and increased manufacturability. The disclosed arrangement is also relatively easily assembled, leading to increased efficiencies relative to prior designs.

Figure 1:
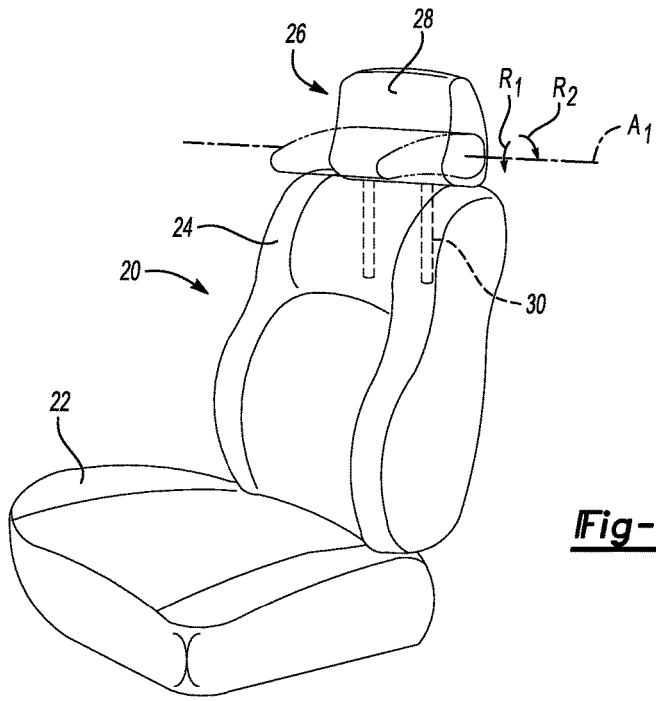
FIG. 1 is a perspective view of a seat including a headrest assembly.

FIG. 1 illustrates an example seat 20 for a motor vehicle. The seat 20 in this example includes a base 22, a seat back 24, and a headrest assembly 26. The headrest assembly 26 includes a head restraint 28 and at least one rod 30. The at least one rod 30 attaches the head restraint 28 to the seat back 24. In this example, the head restraint 28 is moveable between a first locked position, which is shown in FIG. 1, and a second locked position, which is shown in phantom in FIG. 1. The head restraint 28 is also moveable to a plurality of locked positions between the first and second locked positions. For example, the first locked position is a substantially upright position, and in the second locked position the head restraint 28 has been rotated about 90° relative to the first locked position. This disclosure is not limited to any number of locked positions, however, and extends to headrests having two or more locked positions.

Figure 4:
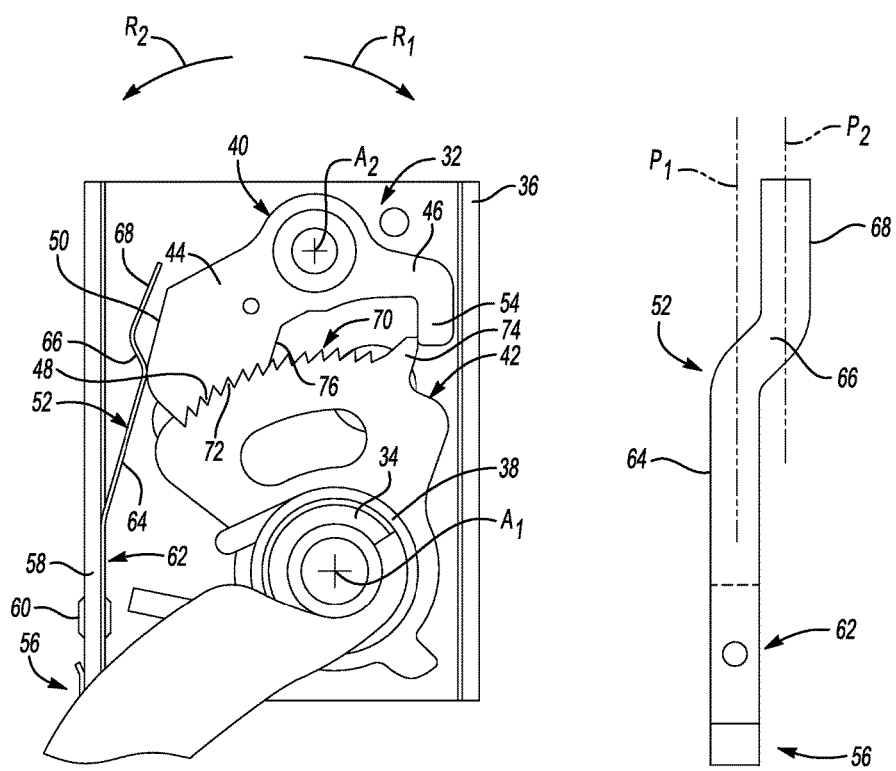
FIG. 4 is a cross-sectional view taken along line 4-4 from FIG. 2.
Figure 5:
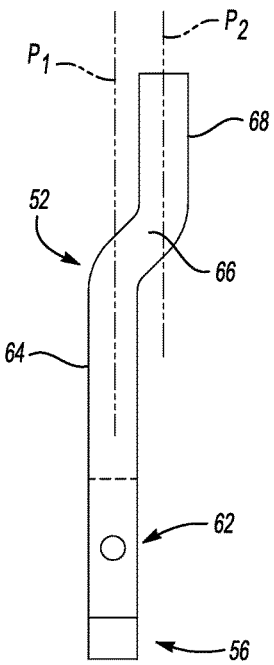
FIG. 5 is a front view of a pawl spring.

In this example, the head restraint 28 is selectively moveable to one of the locked positions by a user. Movement of the head restraint 28 is controlled by a ratchet assembly 32 (FIG. 4). The head restraint 28 is moveable about an axis $A_1$ in a first rotational direction $R_1$ between the first and second locked positions. The first rotational direction $R_1$, in this example, is a forward direction, and is generally counter-clockwise when viewed from the perspective of FIG. 1. As will be discussed below, movement of the head restraint 28 in the direction $R_1$ beyond the second locked position releases the ratchet assembly 32, and allows the head restraint 28 to rotate in a second rotational direction $R_2$, which is opposite the first rotational direction $R_1$.

Figure 2:
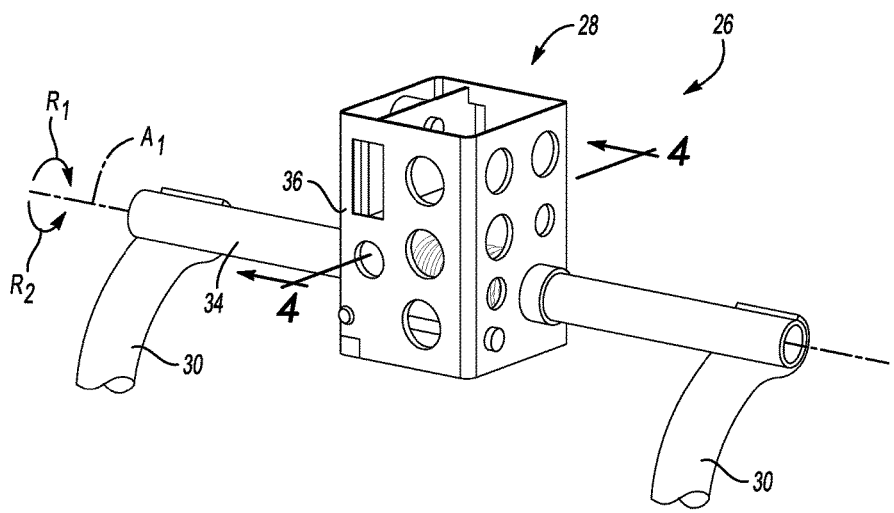
FIG. 2 is a perspective view of an example headrest assembly in a first locked position.
Figure 3:
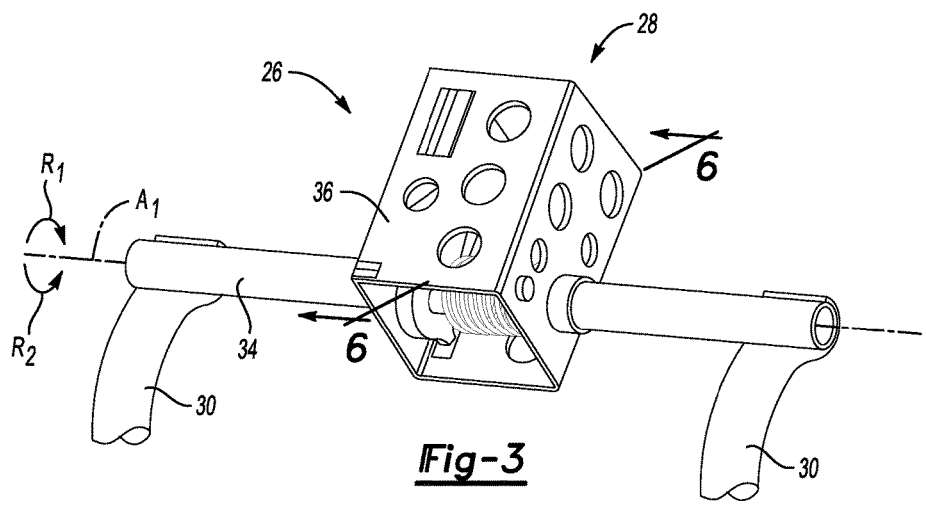
FIG. 3 is a perspective view of the example headrest assembly in a second locked position.

FIGS. 2 and 3 illustrate the head restraint 28 in the first locked position and the second locked position, respectively. While not shown in FIGS. 2 and 3, the head restraint 28 is configured to support a cushion and an encasement. FIG. 1 shows the head restraint 28 supporting a cushion and an encasement, which may include foam encased in fabric, such as leather or cloth.

The head restraint 28 is configured for rotation about a horizontal rod 34, which is connected between two rods 30. The horizontal rod 34 is provided along the axis $A_1$. The head restraint 28 includes a support cage 36 configured for rotation about the horizontal rod 34. The support cage 36 includes one or more plates configured to support the various components of the head restraint 28, including a cushion, encasement, and the components discussed relative to FIGS. 4-7.

FIG. 4 is a cross-sectional view taken along line 4-4 from FIG. 2. As shown in FIG. 4, the head restraint 28 includes a coil spring 38 disposed about the horizontal rod 34. The coil spring 38 is configured to urge the support cage 36, and in turn the head restraint 28, in the second rotational direction $R_2$. An input force of the user in the first rotational direction $R_1$, however, may overcome the bias force of the coil spring 38, thereby rotating the head restraint 28 to one of a plurality of locked positions.

FIG. 4 illustrates the head restraint 28 in a first locked position, which in this example is an upright position. In the upright position, the head restraint 28 projects substantially upward from the seat back 24, and the head restraint 28 is substantially parallel to the seat back 24. This disclosure is not limited to such a position, however, and the first locked position can be another position.

The head restraint 28 is maintained in the first locked position by a ratchet assembly 32. The ratchet assembly 32 includes a pawl 40 and a cam 42. The pawl 40 is rotatable about a second axis $A_2$ in the first and second rotational directions $R_1$, $R_2$. The second axis $A_2$ is spaced upward from (relative to FIG. 4) and substantially parallel to the first axis $A_1$. The pawl 40 includes a first arm 44 and a second arm 46 projecting from opposite sides of the second axis $A_2$.

The first arm 44 of the pawl 40 includes a plurality of teeth 48 configured to engage corresponding teeth 72 of the cam 42, which will be discussed below. When the teeth 48 of the pawl 40 are in contact with the teeth 72 of the cam 42, the ratchet assembly 32 is "engaged" for purposes of this disclosure. When the teeth 48, 72 are not in contact with one another, the ratchet assembly 32 is "disengaged," again for purposes of this disclosure.

Opposite the teeth 48, an upper surface 50 (relative to FIG. 4) of the first arm 44 is substantially smooth and is substantially convex in shape. The upper surface 50 is configured for contact with a pawl spring 52, which will be discussed below.

The second arm 46 of the pawl 40 includes a reset tab 54 at a free end thereof. The reset tab 54 projects downward (relative to FIG. 4) from the second arm 46. As will be described below, the reset tab 54 is configured to engage the cam 42 to engage the ratchet assembly 32.

The pawl spring 52 may be provided by a single piece of material, such as a metallic material, in some examples. The pawl spring 52 cooperates with the pawl 40 and imparts forces on the pawl 40 during use of the head restraint 28. In the illustrated example, the pawl spring 52 includes a clip portion 56 (perhaps best seen in FIG. 6) near a first end thereof. The clip portion 56 fits over an end of a wall 58 of the support cage 36. Adjacent the clip portion 56, a fastener 60, such as a rivet, affixes the pawl spring 52 to the wall 58. This disclosure is not limited to any particular type of fastener.

Adjacent the fastener 60, the pawl spring 52 includes a substantially flat section 62 following the contour of the wall 58. Upward of the flat section 62, the pawl spring 52 projects toward the pawl 40. The pawl spring 52 includes a first section 64 between the flat section 62 and a bend 66. The first section 64 is substantially flat and inclined relative to the flat section 62. At the bend 66, the pawl spring 52 bends in the upward direction (relative to FIG. 4) and in the side-to-side direction (i.e., in-and-out of the page, relative to FIG. 4) in this example. As perhaps best seen with joint reference to FIGS. 4 and 5, the pawl spring 52 bends in the upward direction and to the right (relative to FIG. 5). Upward of the bend 66, the pawl spring 52 includes a second section 68, which lies in a different plane $P_2$ than a plane $P_1$ of the first section 64. The planes $P_1$ and $P_2$ are spaced-apart from one another in a direction perpendicular to the axes $A_1$, $A_2$. Specifically, the plane $P_2$ is spaced to the right of plane $P_1$ relative to FIG. 5. Further, the pawl 40 lies in the plane $P_1$.

With reference to FIG. 4, the cam 42 is mounted to the horizontal rod 34. The cam 42, in this example, is not configured to rotate relative to the horizontal rod 34. An upper surface 70 of the cam 42 includes a plurality of teeth 72 configured to engage the teeth 48 of the pawl 40. On the right-hand side (relative to FIG. 4) of the teeth 72, the cam 42 includes a tooth 74, which is substantially larger than the teeth 72.

Figure 6:
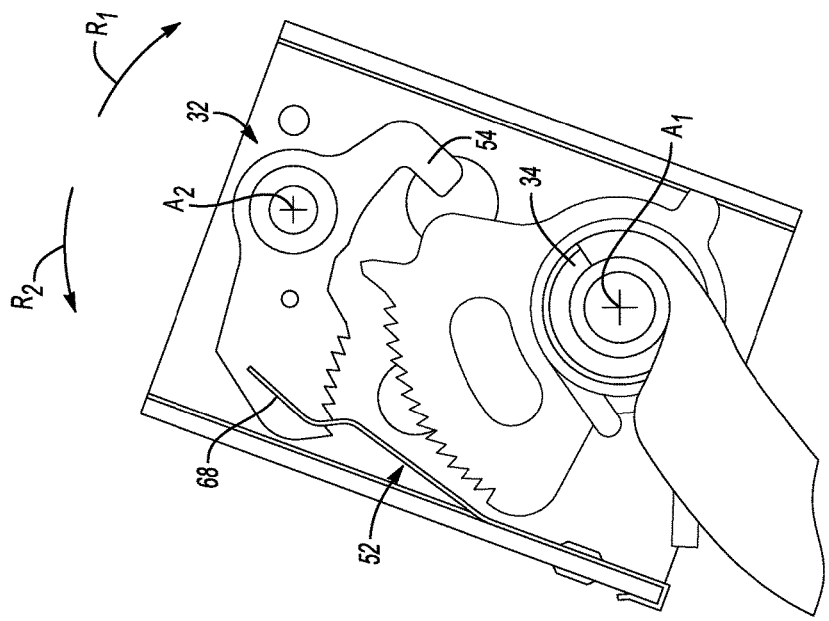
FIG. 6 is a cross-sectional view taken along line 6-6 from FIG. 3.

FIG. 6 is a cross-sectional view taken along line 6-6 from FIG. 3. In FIG. 6, the head restraint 28 has been rotated in the first rotational direction $R_1$ by a user. The head restraint 28 is in the second locked position, which in this example is a last locked position. Again, the head restraint 28 may be rotatable to a plurality of locked positions between the first locked position (FIG. 4) and the second locked position (FIG. 6). In particular, each of the teeth 48, 72 corresponds to a locked position. In this disclosure, there are eight locked positions including the first and second locked positions. In each of the locked positions, the head restraint 28 is inclined at a different angle relative to the seat back 24. The ratchet assembly 32 is configured to hold the head restraint 28 in each of the locked positions until the user rotates the head restraint in the first rotational direction $R_1$ past the second locked position.

In FIGS. 4 and 6, the teeth 48 engage the teeth 72, meaning the ratchet assembly 32 is engaged. When the ratchet assembly 32 is engaged, and when moving the head restraint 48 between the first and second locked positions, the first arm 44 of the pawl 40 is urged in the rotational direction $R_2$ under the force of the pawl spring 52. Specifically, the first section 64 of the pawl spring 52 contacts the upper surface 50 of the first arm 44 and urges the first arm 44 in the second rotational direction $R_2$. In this way, the teeth 48 of the pawl 40 are configured to mate with the teeth 72 of the cam 70. The teeth 48, 72 are shaped such that they mate with one another, and such that the head restraint 28 is only allowed to rotate in the first rotational direction $R_1$ when the ratchet assembly 32 is engaged.

In order to return the head restraint 28 back to the first locked position, a user rotates the head restraint 28 in the first rotational direction $R_1$ beyond the second locked position. Doing so causes the tooth 74 to engage a ramped surface 76 of the first arm 44, which is located to the right (relative to FIG. 6) of the teeth 48. The tooth 74 rotates the pawl 40 in the first rotational direction $R_1$ to a release position. Specifically, the force of the tooth 74 overcomes the bias of the pawl spring 52, and the rotation of the pawl 40 causes the pawl 40 to come out of contact with the teeth 72 and the first section 64 of the pawl spring 52.

Figure 7:
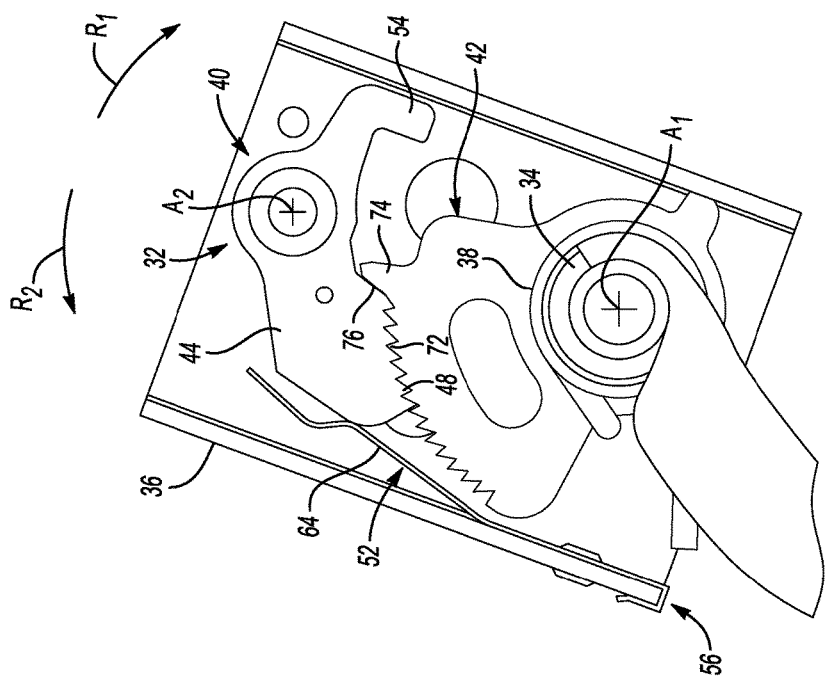
FIG. 7 is a cross-sectional view of the headrest assembly, and illustrates a condition where the ratchet assembly is disengaged.

FIG. 7 illustrates the ratchet assembly 32 in a disengaged position. In FIG. 7, the pawl 42 contacts the second section 68 of the pawl spring 52. Specifically, the side of the first arm 44 facing out-of-the-page in FIG. 6 contacts the left-hand side (relative to FIG. 5) of the second section 68 of the pawl spring 52. In this way, the pawl spring 52 is configured to hold the pawl 40 out of engagement with the cam 42. Specifically, the pawl 40 is held such that the teeth 48 are not in contact with the teeth 72, which allows the head restraint 28 to move in the second rotational direction $R_2$ toward the first locked position under the bias of the spring 38.

In order to resume normal operation, the tooth 74 is configured to engage the reset tab 54 when the head restraint 28 moves back toward the first locked position. Engagement between the tooth 74 and the reset tab 54 causes the pawl 40 to rotate in the second rotational direction $R_2$ about the second axis $A_2$, out of engagement with the second section 68 of the pawl spring 52, and such that the teeth 48 once again engage the teeth 72.

It should be understood that terms such as "upward," "downward," "clockwise," "counter-clockwise," "forward," "rearward," etc., are used above with reference to the orientation of the head restraint in the figures and in its normal operating position. These terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A headrest assembly, comprising:
   a head restraint configured to rotate from a first locked position to a second locked position to incline the head restraint relative to a seat back, wherein:
   the head restraint is configured such that rotation of the head restraint beyond the second locked position causes the head restraint to become urged back to the first locked position,
   the head restraint includes a ratchet assembly having a pawl and pawl spring,
   the pawl spring includes a first section and a second section,
   the first section of the pawl spring is configured to contact the pawl when the head restraint is rotated from the first locked position to the second locked position, and
   the second section of the pawl spring is configured to contact the pawl when the head restraint is rotated beyond the second locked position;
   wherein the second section of the pawl spring is spaced-apart from the first section of the pawl spring in a direction parallel to an axis of rotation of the head restraint such that the second section of the pawl spring lies in a different plane than the first section of the pawl spring.

2. The headrest assembly as recited in claim 1, wherein:
   the second section of the pawl spring is configured to contact a side of the pawl when the head restraint is rotated beyond the second locked position.

3. The headrest assembly as recited in claim 1, wherein:
   the ratchet assembly includes a cam having a first tooth corresponding to the first locked position and a second tooth corresponding to the second locked position, and
   the pawl is configured to engage the first and second teeth to hold the head restraint in the first and second locked positions, respectively.

4. The headrest assembly as recited in claim 3, wherein the first section of the pawl spring is configured to urge the pawl into engagement with the first and second teeth.

5. The headrest assembly as recited in claim 3, wherein:
   the cam includes a third tooth larger than the first and second teeth,
   the pawl is configured to engage the third tooth when the head restraint is rotated beyond the second locked position,
   engagement between the third tooth and the pawl is configured to rotate the pawl to a release position where the pawl does not engage the first and second teeth, and
   the pawl is held in the release position by the second section of the pawl spring.

6. The headrest assembly as recited in claim 5, wherein, when the pawl is in the release position, the head restraint is urged to the first locked position by a spring.

7. The headrest assembly as recited in claim 1, wherein:
   the first locked position corresponds to a substantially upright position of the head restraint relative to the seat back, and
   the second locked position is inclined relative to the first locked position.

8. The headrest assembly as recited in claim 7, wherein:
   the second locked position is a last locked position, and
   a plurality of locked positions are provided between the first and last locked positions.

9. The headrest assembly as recited in claim 1, wherein the head restraint includes at least one plate configured for rotation about a horizontal rod.

10. The headrest assembly as recited in claim 9, wherein the at least one plate includes a plurality of plates.

11. The headrest assembly as recited in claim 9, wherein the ratchet assembly is mounted to the at least one plate.

12. A headrest assembly, comprising:
    a head restraint configured to rotate from a first locked position to a second locked position to incline the head restraint relative to a seat back, wherein:
    the head restraint is configured such that rotation of the head restraint beyond the second locked position causes the head restraint to become urged back to the first locked position,
    the head restraint includes a ratchet assembly having a pawl and pawl spring,
    the pawl spring includes a first section and a second section,
    the first section of the pawl spring is configured to contact the pawl when the head restraint is rotated from the first locked position to the second locked position, and
    the second section of the pawl spring is configured to contact the pawl when the head restraint is rotated beyond the second locked position;
    the ratchet assembly includes a cam having a first tooth corresponding to the first locked position and a second tooth corresponding to the second locked position, and
    the pawl is configured to engage the first and second teeth to hold the head restraint in the first and second locked positions, respectively;
    the cam includes a third tooth larger than the first and second teeth,
    the pawl is configured to engage the third tooth when the head restraint is rotated beyond the second locked position,
    engagement between the third tooth and the pawl is configured to rotate the pawl to a release position where the pawl does not engage the first and second teeth, and
    the pawl is held in the release position by the second section of the pawl spring;
    wherein, when the pawl is in the release position, the head restraint is urged to the first locked position by a spring, and
    wherein the ratchet assembly is configured such that when the head restraint rotates back to the first locked position, the third tooth engages the pawl to rotate the pawl back into engagement with the first tooth of the cam.

13. The headrest assembly as recited in claim 12, wherein:
the pawl is configured to rotate about an axis,
the pawl includes a first arm and a second arm projecting from opposite sides of the axis,
the first arm of the pawl is configured to engage the first and second teeth, and
the second arm of the pawl is configured to engage the third tooth when the head restraint rotates back to the first locked position.

14. A seat for a motor vehicle, comprising:
a seat back;
a headrest assembly, comprising:
a head restraint configured to rotate from a first locked position to a second locked position to incline the head restraint relative to the seat back, wherein:
the head restraint is configured such that rotation of the head restraint beyond the second locked position causes the head restraint to become urged to the first locked position,
the head restraint includes a ratchet assembly having a pawl and pawl spring,
the pawl spring includes a first section and a second section,
the first section of the pawl spring is configured to contact the pawl when the head restraint is rotated from the first locked position to the second locked position,
the second section of the pawl spring is configured to contact the pawl when the head restraint is rotated beyond the second locked position, and
wherein the second section of the pawl spring is spaced-apart from the first section of the pawl spring in a direction parallel to an axis of rotation of the head restraint such that the second section of the pawl spring lies in a different plane than the first section of the pawl spring.

15. The seat as recited in claim 14, wherein:
the first section of the pawl spring is configured to contact an end of the pawl when the head restraint is rotated from the first locked position to the second locked position, and
the second section of the pawl spring is configured to contact a side of the pawl when the head restraint is rotated beyond the second locked position.

16. The seat as recited in claim 14, wherein:
the ratchet assembly includes a cam having a first tooth corresponding to the first locked position and a second tooth corresponding to the second locked position, and
the pawl is configured to engage the first and second teeth to hold the head restraint in the first and second locked positions, respectively.

17. The seat as recited in claim 16, wherein:
the cam includes a third tooth larger than the first and second teeth,
the pawl is configured to engage the third tooth when the head restraint is rotated beyond the second locked position,
engagement between the third tooth and the pawl is configured to rotate the pawl to a release position where the pawl cannot engage the first and second teeth,
the pawl is held in the release position by the second section of the pawl spring.

18. The seat as recited in claim 14, wherein the head restraint is connected to the seat back by two vertical rods, and further comprising a horizontal rod connected between the two vertical rods, wherein the head restraint includes at least one plate configured for rotation about the horizontal rod.

19. The seat as recited in claim 18, wherein the at least one plate includes a plurality of plates.

20. The seat as recited in claim 18, wherein the at least one plate provides a support cage.

21. The seat as recited in claim 18, wherein the ratchet assembly is mounted to the at least one plate.

22. A seat for a motor vehicle, comprising:
a seat back;
a headrest assembly, comprising:
a head restraint configured to rotate from a first locked position to a second locked position to incline the head restraint relative to the seat back, wherein:
the head restraint is configured such that rotation of the head restraint beyond the second locked position causes the head restraint to become urged to the first locked position,
the head restraint includes a ratchet assembly having a pawl and pawl spring,
the pawl spring includes a first section and a second section,
the first section of the pawl spring is configured to contact the pawl when the head restraint is rotated from the first locked position to the second locked position, and
the second section of the pawl spring is configured to contact the pawl when the head restraint is rotated beyond the second locked position;
the ratchet assembly includes a cam having a first tooth corresponding to the first locked position and a second tooth corresponding to the second locked position, and
the pawl is configured to engage the first and second teeth to hold the head restraint in the first and second locked positions, respectively
the cam includes a third tooth larger than the first and second teeth,
the pawl is configured to engage the third tooth when the head restraint is rotated beyond the second locked position,
engagement between the third tooth and the pawl is configured to rotate the pawl to a release position where the pawl cannot engage the first and second teeth,
the pawl is held in the release position by the second section of the pawl spring,
wherein the ratchet assembly is configured such that when the head restraint rotates back to the first locked position, the third tooth engages the pawl to rotate the pawl back into engagement with the first tooth of the cam.

23. A method, comprising:
tilting a head restraint to move the head restraint from a first locked position to a second locked position, the head restraint held in the first and second locked positions by a ratchet assembly including a pawl and a pawl spring, the pawl spring having a first section and a second section, the second section of the pawl spring being spaced-apart from the first section of the pawl spring in a direction parallel to an axis of rotation of the head restraint such that the second section of the pawl spring lies in a different plane than the first section, wherein the first section of the pawl spring is in contact with the pawl as the head restraint is tilted from the first locked position to the second locked position;
tilting a head restraint beyond the second locked position; and
moving the head restraint back to the first locked position, wherein the second section of the pawl spring is in contact with the pawl as the head restraint moves back to the first locked position.

24. The method as recited in claim 23, further comprising:
rotating the pawl such that the pawl contacts the first section of the pawl spring when the head restraint is moved back to the first locked position.

25. The method as recited in claim 24, wherein:
the head restraint includes a first plurality of teeth and a tooth larger than the first plurality of teeth,
the tooth rotates the pawl into contact with the second section of the pawl spring when the head restraint is tilted beyond the second locked position, and
the tooth rotates the pawl into contact with the first section of the pawl spring when the head restraint is moved back to the first locked position.

* * * * *

UNITED STATES PATENT AND TRADEMARK OFFICE
CERTIFICATE OF CORRECTION

PATENT NO. : 10,166,899 B1  
APPLICATION NO. : 15/983358  
DATED : January 1, 2019  
INVENTOR(S) : Yintai Jiang, Jianhua Wang and Guojun Tang Page 1 of 1

It is certified that error appears in the above-identified patent and that said Letters Patent is hereby corrected as shown below:

In the Claims

In Claim 1, Column 7, Line 33; replace "pawl and pawl spring," with --pawl and a pawl spring,--

In Claim 12, Column 8, Line 36; replace "pawl and pawl spring," with --pawl and a pawl spring,--

In Claim 14, Column 9, Line 21; replace "pawl and pawl spring," with --pawl and a pawl spring,--

In Claim 22, Column 10, Line 18; replace "pawl and pawl spring," with --pawl and a pawl spring,--

Signed and Sealed this  
Thirtieth Day of July, 2019

Andrei Iancu  
*Director of the United States Patent and Trademark Office*